United States Patent
Hong

(10) Patent No.: US 11,449,410 B2
(45) Date of Patent: Sep. 20, 2022

(54) UNIVERSAL RUNTIME VERIFICATION SYSTEM BETWEEN SOURCE LANGUAGE AND LANGUAGE CONVERTED THROUGH TRANSPILER

(71) Applicant: TMAXSOFT CO., LTD, Gyeonggi-do (KR)

(72) Inventor: Seokjun Hong, Gyeonggi-do (KR)

(73) Assignee: TMAXSOFT CO., LTD, Gyeonggi-do (KR)

( * ) Notice: Subject to any disclaimer, the term of this patent is extended or adjusted under 35 U.S.C. 154(b) by 204 days.

(21) Appl. No.: 16/830,742

(22) Filed: Mar. 26, 2020

(65) Prior Publication Data
US 2021/0294725 A1  Sep. 23, 2021

(30) Foreign Application Priority Data
Mar. 23, 2020  (KR) .................. 10-2020-0035084

(51) Int. Cl.
*G06F 11/36* (2006.01)
*G06F 8/51* (2018.01)

(52) U.S. Cl.
CPC ............ *G06F 11/3612* (2013.01); *G06F 8/51* (2013.01); *G06F 11/3664* (2013.01)

(58) Field of Classification Search
None
See application file for complete search history.

(56) References Cited

U.S. PATENT DOCUMENTS

| 10,073,686 B1 | 9/2018 | Kumar |
| 2012/0079465 A1 | 3/2012 | Harvey |
| 2015/0178104 A1 * | 6/2015 | Venkatasubramanian .................. G06F 9/44589 717/126 |
| 2015/0339108 A1 | 11/2015 | Miller et al. |
| 2016/0350204 A1 * | 12/2016 | Conlon ............... G06F 11/3466 |
| 2017/0139690 A1 * | 5/2017 | Pesarese .................. G06F 8/41 |
| 2018/0275977 A1 * | 9/2018 | Kudriavtsev ............. G06F 8/51 |

(Continued)

FOREIGN PATENT DOCUMENTS

| JP | 5908374 B2 | 4/2016 |
| KR | 1020150122149 A | 10/2015 |
| KR | 101786156 B1 | 10/2017 |

OTHER PUBLICATIONS

Office Action for Korean Patent Application No. 10-2020-0035084 dated Apr. 30, 2021; 4 pgs.

*Primary Examiner* — Lewis A Bullock, Jr.
*Assistant Examiner* — Mark A Gooray
(74) *Attorney, Agent, or Firm* — Umberg Zipser LLP; Ryan Dean

(57) ABSTRACT

Disclosed is a computer program stored in a computer readable storage medium, the computer program including commands which cause a processor of a server to execute operations below, the operations including: if a first program written in a source language is converted to a second program written in a target language, generating block information for the first program by analyzing the first program; inserting an annotation into the second program, wherein the annotation includes information on at least one source line, which is included in the first program, associated with at least one target line included in the second program; generating meta information associated with runtime verification based on the block information and the annotation.

13 Claims, 10 Drawing Sheets

(56) References Cited

U.S. PATENT DOCUMENTS

2019/0362077 A1 11/2019 Schornack et al.
2020/0225915 A1* 7/2020 Wong ..................... G06F 8/51

* cited by examiner

Fig. 2

```
{
    "blocks": [
        {"block_ID": <block_ID>, "vars": ["var_name1", "var_name1"...]},
        {"block_ID": <block_ID>, "vars": ["var_name1", "var_name1"...]},
        ....
    ],
}
```

Fig. 3

```
      310a   320a    330a                    300a
       ⌒     ⌒       ⌒                        ⌒
//@generated file, line_num, block_id
```
ITEM04.setValue(ArithUtil.add(ITEM01, ITEM02, ITEM03, ITEM04));

(a)

```
      310b   320b    330b  340               300b
       ⌒     ⌒       ⌒     ⌒                  ⌒
//@generated file, line_num, block_id, 4
```
ITEM04.setValue(ArithUtil.add(ITEM01, ITEM02, ITEM03, ITEM04));
temp_NumericLiteral1 = ArithUtil.add(ITEM01, ITEM02, ITEM03, ITEM05);
temp_NumericLiteral1 = ArithUtil.round(temp_NumericLiteral1, ITEM05);
ITEM05.setValue(temp_NumericLiteral1);

(b)

```
                                              300c
                                               ⌒
//@generated file,        line_num,    block_id
//@generated file, 310c   line_num, 320c block_id  330c
//@generated file,        line_num,    block_id
```
ITEM04.setValue(ArithUtil.add(ITEM01, ITEM02, ITEM03, ITEM04));

```
                                              ┌─ 400
"blocks": [
  {                     410
    "block": <block_id>,
                                420
    "vars": ["var_name1", "var_name2", ...],
                                         430
    "statements": [
      {
        "target": {           432
          "bp": <file>:<line_number>,
          "type": <PLAIN>  — 433
        },
        "source": {           431
          "bp": <file>:<line_number>,
          "type": <PLAIN>  — 433
        },
      },
    ]
  },
  ],
```

UNIVERSAL RUNTIME VERIFICATION SYSTEM BETWEEN SOURCE LANGUAGE AND LANGUAGE CONVERTED THROUGH TRANSPILER

TECHNICAL FIELD

The present disclosure relates to a method and a server for performing runtime verification.

BACKGROUND ART

According to the development of the computer technology, various programs for easy and convenient writing of office work are distributed. Further, the number of programming languages for making various programs is also increasing.

The programming language includes Java, Java Script, C, C++, Python, PHP, SQL, and the like.

In the meantime, the writing and the execution of the programming language may also be performed through a program executable in a computer device. Further, the program is also constantly updated for a better development environment, and a program of a new language is also being developed and distributed.

In the meantime, the language conversion between the different program languages may be performed by using a transpiler.

However, even though the program language is converted by using the transpiler, there may be an error in a performance value obtained through a computation of the program language or an intermediate process.

Accordingly, there is a demand for the development of a method of verifying whether the language is correctly converted during the conversion.

RELATED ART LITERATURE

Patent Document

U.S. patent Ser. No. 15/673,757

SUMMARY OF THE INVENTION

The present disclosure is conceived in response to the background art, and has been made in an effort to provide a computer program and a server for verifying runtime.

The technical objects of the present disclosure are not limited to the foregoing technical objects, and other non-mentioned technical objects will be clearly understood by those skilled in the art from the description below.

An exemplary embodiment of the present disclosure for solving the problem discloses a computer program stored in a computer readable storage medium. The computer program includes commands which cause a processor of a server to execute operations below, the operations including: if a first program written in a source language is converted to a second program written in a target language, generating block information for the first program by analyzing the first program, in which the annotation includes information on at least one source line, which is included in the first program, associated with at least one target line included in the second program; generating meta information associated with runtime verification based on the block information and the annotation.

The operation may further include, when a runtime verification performing command is received, performing runtime verification on the first program and the second program based on the meta information.

The block information may include identification information on each of at least one block included in the first program and information on each of at least one variable included in each of at least one block.

The annotation may include location information on at least one source line in the first program and information on a block including at least one source line in the first program.

When at least one block includes a first block, the meta information may include block identification information on the first block, information on at least one source variable included in the first block, and statement information on at least one statement associated with each of at least one source variable.

The statement information may include first location information on a location of a breakpoint associated with each of at least one source variable in the first program, second location information on a location of a breakpoint associated with each of at least one source variable in the second program, and type information associated with a method of converting at least one first statement in the first program into the target language.

The type information may include first type information indicating that one source line included in the first program is converted to one target line included in the second program, second type information indicating that one source line included in the first program is converted to the plurality of target lines included in the second program, and third type information indicating that the plurality of source lines included in the first program is converted to one target line included in the second program.

The method may further include: when the runtime verification performing command is received, recognizing an execution order of each of all blocks included in the first program; and performing the runtime verification on the first program and the second program by using the meta information according to the execution order.

The performing of the runtime verification on the first program and the second program by using the meta information according to the execution order may include: when the runtime verification is performed on the first block among all of the blocks, designating a first breakpoint to the first program by using the meta information and executing the first program; designating a second breakpoint to the second program by using the meta information and executing the second program; recognizing a first location at which the execution is stopped by the first breakpoint after the execution of the first program and a second location at which the execution is stopped by the second breakpoint after the execution of the second program; when the first location and the second location are recognized to be the location associated with the first block, obtaining source variable data for the runtime verification of the first program and target variable data for the runtime verification of the second program based on the type information included in the meta information; and determining whether a runtime error for the first block is generated based on whether the source variable data matches the target variable data.

The determining of whether the runtime error for the first block is generated based on whether the source variable data matches the target variable data may include: determining that the runtime error exists in the first block when it is recognized that the source variable data does not match the target variable data; or determining that the runtime error does not exist in the first block when it is recognized that the source variable data matches the target variable data.

The recognizing of the execution order of each of all blocks included in the first program when the runtime verification performing command is received may include: when execution order information on each of all blocks included in the first program is included in the meta information, recognizing the execution order of each of all blocks based on the execution order information.

The recognizing of the execution order of each of all blocks included in the first program when the runtime verification performing command is received may include: designating a third breakpoint to the beginning source statements and the final source statements of all of the blocks included in the first program and then executing the first program; designating a fourth breakpoint to the beginning target statements and the final target statements of all of the blocks included in the second program and then executing the second program; and recognizing the execution order based on an execution result of the first program and an execution result of the second program.

The obtaining of the source variable data for the runtime verification of the first program and the target variable data for the runtime verification of the second program based on the type information included in the meta information may include, when the type information is the first type information, obtaining the source variable data by executing the first program to the first location, and obtaining the target variable data by executing the second program to the second location.

The obtaining of the source variable data for the runtime verification of the first program and the target variable data for the runtime verification of the second program based on the type information included in the meta information may include, when the type information is the second type information, obtaining the source variable data by executing the first program to the first location, and obtaining the target variable data by executing all of the plurality of target lines included in the second program.

The obtaining of the source variable data for the runtime verification of the first program and the target variable data for the runtime verification of the second program based on the type information included in the meta information may include, when the type information is the third type information, obtaining the source variable data by executing all of the plurality of source lines included in the first program, and obtaining the target variable data by executing the second program to the second location.

The technical solutions obtainable from the present disclosure are not limited to the foregoing solutions, and other non-mentioned solution means will be clearly understood by those skilled in the art from the description below.

According to the exemplary embodiments of the present disclosure, when a program written in a source language is converted to a program written in a target language, it is possible to accurately check whether the conversion is correctly performed.

The effects obtainable from the present disclosure are not limited to the foregoing effects, and other non-mentioned effects will be clearly understood by those skilled in the art from the description below.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it will be apparent that the aspect(s) may be carried out without the specific details. In other examples, publicly known structures and devices are illustrated in the form of a block diagram for easy description of one or more aspects.

FIG. 2 is a diagram for describing an example of block information according to exemplary embodiments of the present disclosure.

FIG. 3 is a diagram for describing an example of an annotation according to exemplary embodiments of the present disclosure.

FIG. 4 is a diagram for describing an example of meta information according to exemplary embodiments of the present disclosure.

DETAILED DESCRIPTION

Figure 1:
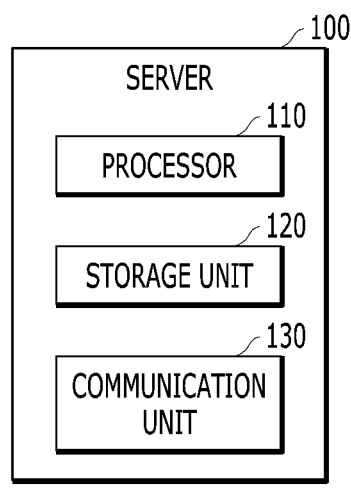
FIG. 1 is a block diagram for describing an example of a server according to exemplary embodiments of the present disclosure.

Various exemplary embodiments and/or aspects are now disclosed with reference to the drawings. In the description below, the plurality of particular detailed matters are disclosed for helping general understanding of one or more aspects for the purpose of description. However, the point that the aspect(s) is executable even without the particular detailed matters may also be recognized by those skilled in the art. The subsequent description and the accompanying drawings describe specific illustrative aspects of one or more aspects in detail. However, the aspects are illustrative, and some of the various methods of various aspects of the principles may be used, and the descriptions intend to include the aspects and the equivalents thereof. Particularly, an "exemplary embodiment", an "example", an "aspect", an "illustration", and the like used in the present specification may not be construed to be better or have an advantage compared to a predetermined described aspect, an aspect having a different design, or designs.

Hereinafter, the same or similar constituent element is denoted by the same reference numeral regardless of a reference numeral, and a repeated description thereof will be omitted. Further, in describing the exemplary embodiment disclosed in the present disclosure, when it is determined that detailed description relating to well-known functions or configurations may make the subject matter of the exemplary embodiment disclosed in the present disclosure ambiguous, the detailed description will be omitted. Further, the accompanying drawings are provided for helping to easily understand exemplary embodiments disclosed in the present specification, and the technical spirit disclosed in the present specification is not limited by the accompanying drawings.

Although "a first", "a second", and the like are used for describing various elements or constituent elements, but the elements or the constituent elements are not limited by the terms. The terms are used for discriminating one element or constituent element from another element or constituent element. Accordingly, a first element or constituent element mentioned below may also be a second element or constituent element within the technical spirit of the present disclosure as a matter of course.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined.

A term "or" intends to mean comprehensive "or" not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Terms "information" and "data" used in the present specification may be frequently used to be exchangeable with each other.

Suffixes, " . . . module" and " . . . unit" for a constituent element used for the description below are given or mixed in consideration of only easiness of the writing of the specification, and the suffix itself does not have a discriminated meaning or role.

An object and an effect of the present disclosure, and technical configurations for achieving them will be apparent when the exemplary embodiments, which are described below in detail together with the accompanying drawing, are referred. In the description of the present disclosure, when a detailed description of a related publicly known function or configuration is determined to unnecessarily make the subject matter of the present disclosure unclear, the detailed description will be omitted. In addition, the terminology used in the description is defined in consideration of the function of corresponding components used in the present disclosure and may be varied according to users, operator's intention, or practices.

The scope of the method in the claims of the present disclosure is generated by the functions and the characteristics described in each of the operations, and is not influenced by a description order of each operation in the claims unless the order of precedence is specified in the operations of the method. For example, in the claim of the method including operation A and operation B, even though operation A is written before operation B, the scope is not limited to that operation B should precede operation B.

However, the present disclosure is not limited to the exemplary embodiments disclosed below, and may be implemented in various different forms. However, the present exemplary embodiments are provided to make the present disclosure complete and to completely transfer the scope of the disclosure to those skilled in the art, and the present disclosure is simply defined by the claims. Accordingly, the definitions thereof should be made based on the entire contents of the present specification.

In the present disclosure, a processor of a server may convert a first program written in a source language to a second program written in a target language. Herein, the first program and the second program may be the programs written in the development languages, such as Java, Java script, C, C++, Python, PHP, and SQL. In this case, the processor may convert a program written in the C language to the program written in the C++ languages or other languages. However, the present disclosure is not limited thereto.

In the meantime, when the processor of the server converts the first program to the second program, the processor may generate meta information for recognizing whether the program is correctly converted. Further, the processor of the server may perform runtime verification by using the generated meta information. Hereinafter, the method of performing the runtime verification by the processor according to the present disclosure will be described with reference to FIGS. 1 to 9.

FIG. 1 is a block diagram for describing an example of a server according to exemplary embodiments of the present disclosure.

The server 100 may include a predetermined type of computer system or computer device, for example, a microprocessor, a main frame computer, a digital processor, a portable device, and a device controller. However, the present disclosure is not limited thereto.

In the meantime, referring to FIG. 1, a server 100 in the present disclosure may include a processor 110, a storage unit 120, and a communication unit 130. However, the constituent elements are not essential for implementing the server 100, so that the server 100 may have the constituent elements more or less than the listed constituent elements.

The processor 110 may control a general operation of the server 100. The processor 110 may provide or process appropriate information or function by processing a signal, data, information, and the like input or output through the constituent elements of the server 100 or driving an application program stored in a memory.

The processor 110 may be a Central Processing Unit (CPU), a co-processor, an Arithmetic Processing Unit (APU), a Graphic Processing Unit (GPU), a Digital Signal Processor (DSP), an Application Processor (AP), and a Communication Processor (CP), and the like. However, the present disclosure is not limited thereto.

In the present disclosure, the processor 110 may convert a first program written in a source language to a second program written in a target language. Further, the processor 110 may perform runtime verification by executing each of the first program and the second program. To this end, in the present disclosure, each of the first program and the second program may be the independently executable program. However, the present disclosure is not limited thereto.

In the meantime, the storage unit 120 may include a memory and/or a permanent storage medium. The memory may include at least one type of storage medium among a flash memory type, a hard disk type, a multimedia card micro type, and the card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The storage unit 120 may store the predetermined form of information generated or determined by the processor 110 and the predetermined form of information received by the communication unit 130.

The communication unit 130 may include one or more modules capable of establishing communication between the server 100 and a communication system, the server 100 and at least one user terminal (not illustrated), or the server 100 and a network. The communication unit 130 may include at least one of a wired Internet module and a wireless Internet module.

In the meantime, in the present disclosure, the communication unit 130 may receive a signal, such as a command, directing to perform the runtime verification of the first program and the second program from a user of a user terminal. However, the present disclosure is not limited thereto.

In the meantime, in the present disclosure, when the processor 110 of the server 100 converts the first program written in the source language to the second program written in the target language, the processor 110 of the server 100 may generate block information on the first program by analyzing the first program. Herein, the block information may be the information on the block that is the minimum execution unit for performing the runtime verification. Hereinafter, the block information according to the present disclosure will be described with reference to FIG. 2.

FIG. 2 is a diagram for describing an example of block information according to exemplary embodiments of the present disclosure.

In the present disclosure, the processor 110 may generate meta information used when the runtime verification is performed based on block information and an annotation which is to be described below.

Particularly, referring to FIG. 2, block information 200 may include identification information 210 on each of at least one block included in the first program and information 220 on each of at least one variable included in each of at least one block. However, the present disclosure is not limited thereto.

The identification information 210 on each of at least one block included in the first program may include a block ID (identification) or a block name. However, the present disclosure is not limited thereto.

In the meantime, the information 220 on each of at least one variable included in each of at least one block may include at least one variable name and the like. However, the present disclosure is not limited thereto.

In the meantime, in the present disclosure, the processor 110 may also generate only the information 220 on the variable recognized as needing runtime verification. However, the present disclosure is not limited thereto.

In the meantime, in the present disclosure, when the processor 110 converts the first program written in the source language to the second program written in the target language, the processor 110 may insert an annotation to the second program.

However, the present disclosure is not limited thereto, and after the processor 110 converts the first program written in the source language to the second program written in the target language, the processor 110 may insert an annotation to the second program. Hereinafter, the annotation according to the present disclosure will be described with reference to FIG. 3.

FIG. 3 is a diagram for describing an example of an annotation according to exemplary embodiments of the present disclosure. FIG. 3A is a diagram for describing an example of a first type of annotation according to exemplary embodiments of the present disclosure. FIG. 3B is a diagram for describing an example of a second type of annotation according to exemplary embodiments of the present disclosure. FIG. 3C is a diagram for describing an example of a third type of annotation according to exemplary embodiments of the present disclosure.

In the present disclosure, the annotation may include information on at least one source line, which is included in the first program, associated with at least one target line included in the second program. That is, the second program may include an annotation indicating a part of a source code of the first program, which is associated with a source code (particularly, at least one line) written in each target language, as well as a source code written in the target language. Herein, the source line may mean the line included in the source code of the first program, and the target line may mean the line included in the source code of the second program.

Particularly, the annotation may include information on a file name of the first program written in the source language used for generating the second program written in the target language, location information about at least one source line associated with the target line of the second program in the first program, and information on at least one block including at least one source line. However, the present disclosure is not limited thereto.

The information on the file name of the first program may be the information on the file name of the first program written in the source language used for generating the second program written in the target language.

The location information about at least one source line may mean a line number in which at least one source line is located in the first program. However, the present disclosure is not limited thereto.

The information on the block including at least one source line may be a block ID or a block name of a block including at least one source line associated with at least one target line in the first program. However, the present disclosure is not limited thereto.

In the meantime, the annotation may be disposed at an upper side of the topmost line of at least one target line associated with the corresponding annotation. However, the present disclosure is not limited thereto.

According to the exemplary embodiments of the present disclosure, the annotation may include different information depending on how many source lines the target line included in the second program is associated with or how many target lines one source line is converted to.

For example, referring to FIG. 3A, when one source line in the first program is converted to one target line in the second program, an annotation 300a may include information 310a on a file name of the first program including one source line associated with one target line, location information 320a about one source line in the first program, and information 330a on the block including one source line. However, the present disclosure is not limited thereto.

For another example, referring to FIG. 3B, when one source line in the first program is converted to four target lines in the second program, an annotation 300b may include information 310b on a file name of the first program including one source line associated with four target lines, location information 320b about one source line in the first program, and information 330b on the block including one source line. In the meantime, since one source line is converted to the plurality of target lines, the annotation 300b may further include information 340 indicating that four target lines are associated. However, the present disclosure is not limited thereto.

For another example, referring to FIG. 3C, when three source lines in the first program are converted to one target line in the second program, an annotation 300c may include information 310c on a file name of the first program including each of the three source lines, location information 320c about each of the three source lines in the first program, and information 330c on the block including each of the three source lines.

Accordingly, the processor 110 of the server 100 may recognize how many source lines have been converted into how many target lines by analyzing the annotation.

In the meantime, when the plurality of target lines is present, the processor 110 of the server 100 may also generate the plurality of annotations including information on the source line associated with each of the plurality of target lines.

Particularly, when a first source line in the first program is converted to a second target line in the second program and a second source line in the first program is converted to a second target line in the second program, the processor 110 of the server 100 may insert a first annotation, which indicates that the first target line is associated with the first source line, on the first target line, and insert a second annotation, which indicates that the second target line is associated with the second source line, on the second target line.

In the meantime, in the present disclosure, the processor 110 of the server 100 may generate meta information associated with runtime verification based on the block information 200 and the annotation 300. Hereinafter, the meta information according to the present disclosure will be described with reference to FIG. 4.

FIG. 4 is a diagram for describing an example of meta information according to exemplary embodiments of the present disclosure.

Referring to FIG. 4, the meta information 400 may include block identification information 410, information 220 on at least one source variable, and statement information 430. However, the present disclosure is not limited thereto.

When at least one block includes a first block in the first program written in the source language, the block identification information 410 may represent identification information associated with the first block.

For example, the block identification information 410 may include a block ID or a block name of the first block. However, the present disclosure is not limited thereto.

In the meantime, the information 420 on at least one source variable may include an ID of at least one source variable included in the first block or a name of the source variable. However, the present disclosure is not limited thereto.

In the meantime, the statement information 430 may be the information on at least one statement associated with each of at least one source variable. Herein, the statement may be a minimum executable and independent code fragment included in the first program. However, the present disclosure is not limited thereto.

In the meantime, in the present disclosure, the statement information 430 may include first location information 431, second location information 432, and type information 433. However, the present disclosure is not limited thereto.

The first location information 431 may be the information on a location of a breakpoint associated with each of at least one source variable in the first program. Hereinafter, the breakpoint is for the purpose of debugging, and may mean a location that intentionally stops the first program for a while or completely. However, the present disclosure is not limited thereto.

In the meantime, the first location information 431 may include a file name of the first program and information on a line in which the breakpoint is to be located in the first program. However, the present disclosure is not limited thereto.

The second location information 432 may be the information on a location of a breakpoint associated with each of at least one source variable in the second program. Herein, the breakpoint may be a place that intentionally stops the second program for a while or completely. However, the present disclosure is not limited thereto.

In the meantime, the second location information 432 may include a file name of the second program and information on a line in which the breakpoint is to be located in the second program. However, the present disclosure is not limited thereto.

In the meantime, the type information 433 may be the information associated with a method of converting at least one first statement in the first program into the target language.

Particularly, the type information 433 may include first type information indicating that one source line included in the first program is converted to one target line included in the second program, second type information indicating that one source line included in the first program is converted to the plurality of target lines included in the second program, and third type information indicating that the plurality of source lines included in the first program is converted to one target line included in the second program. That is, any one type information among the first type information, the second type information, and the third type information may be described in the type information 433. However, the present disclosure is not limited thereto.

In the meantime, the processor 110 of the server 100 may generate the block information 200, the annotation 300, and the meta information 400 as described with reference to FIGS. 2 to 4. Further, the processor 110 may generate the meta information 400 by using the block information 200 and the annotation 300, and may perform runtime verification based on the meta information 400. Hereinafter, the method of performing the runtime verification by the processor 110 will be described with reference to FIGS. 5 to 9.

Figure 5:
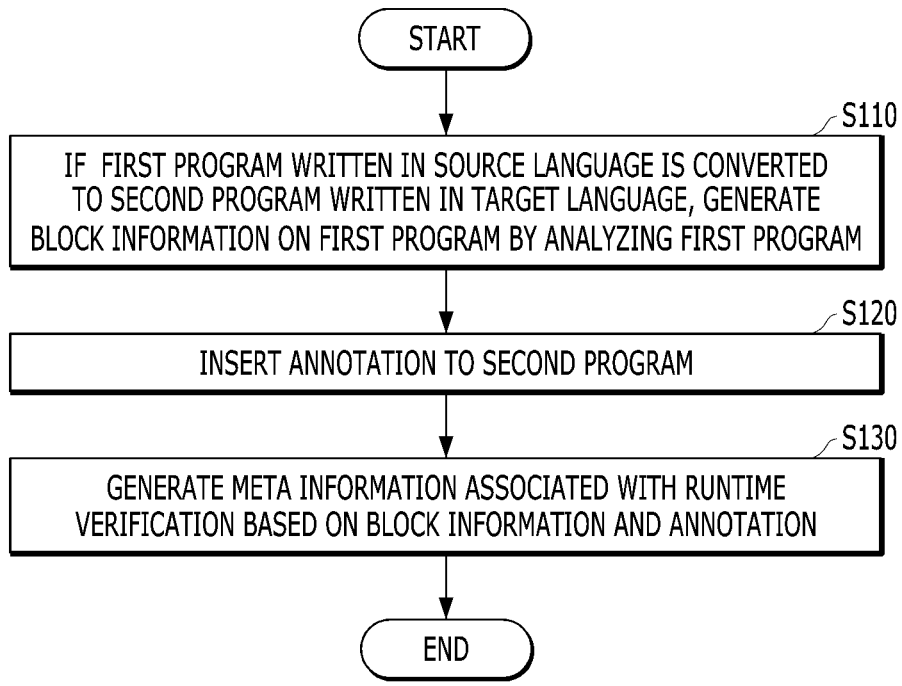
FIG. 5 is a flowchart for describing an example of a method of generating meta information by a processor of a server according to exemplary embodiments of the present disclosure.

FIG. 5 is a flowchart for describing an example of the method of generating meta information by the processor of the server according to exemplary embodiments of the present disclosure.

Referring to FIG. 5, if the processor 110 of the server 100 converts a first program written in a source language to a second program written in a target language, the processor 110 of the server 100 may generate block information on the first program by analyzing the first program (S110).

For example, the processor 110 may generate block information 200 including identification information 210 on each of at least one block included in the first program and information 220 on each of at least one variable included in each of at least one block. However, the present disclosure is not limited thereto.

In the meantime, the processor 110 of the server 100 may insert an annotation 300 to the second program (S120).

For example, the processor 110 may insert the annotation including information on a file name of the first program written in the source language used for generating the second program written in the target language, location information about at least one source line associated with the target line of the second program in the first program, and information on at least one block including at least one source line to the second program. However, the present disclosure is not limited thereto, and the annotation may further include information indicating the number of target lines generated from one source line when one source line is converted to the plurality of target lines.

In the meantime, the processor 110 of the server 100 may generate meta information 400 associated with runtime verification based on the block information 200 and the annotation 300 (S130).

For example, the processor 110 may generate the meta information 400 including block identification information 410, information 420 on at least one source variable, and statement information 430. However, the present disclosure is not limited thereto.

In the meantime, when the processor 110 of the server 100 receives a runtime verification performing command, the processor 110 of the server 100 may perform the runtime verification on the first program and the second program based on the meta information 400.

For example, the processor 110 may receive the runtime verification performing command from a user terminal (not illustrated) through the communication unit 130. However, the present disclosure is not limited thereto, and the processor 110 may also perform the runtime verification at a predetermined time through a scheduling execution.

In the meantime, when the processor 110 receives the runtime verification performing command, the processor 110 may obtain source variable data for the runtime verification of the first program and target variable data for the runtime verification of the second program by using the meta information 400. Further, the processor 110 may perform the runtime verification based on whether the source variable data matches the target variable data. Hereinafter, a particular method of determining whether a runtime error is generated by performing the runtime verification by the processor 110 of the server 100 will be described below with reference to FIGS. 8 and 9.

According to the foregoing configuration, the processor 110 of the server 100 may generate the meta information 400, and perform the runtime verification on the first program and the second program by using the generated meta information. Accordingly, the runtime verification performed by the processor 110 may be reliably performed.

In the meantime, according to the exemplary embodiments of the present disclosure, the meta information 400 may also include an execution order of each of all blocks included in the first program. In this case, the processor 110 of the server 100 may perform the runtime verification by using the meta information 400 according to the execution order. Hereinafter, the method of performing, by the processor 1100, the runtime verification according to the execution order will be described with reference to FIG. 6.

Figure 6:
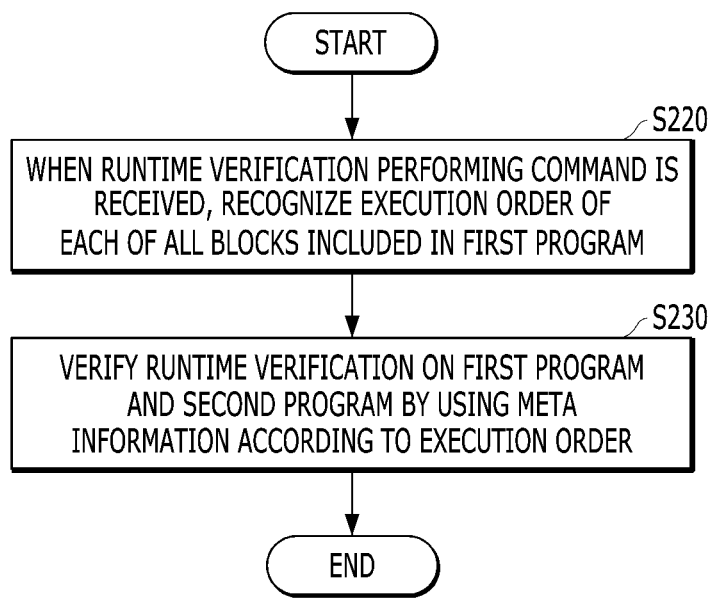
FIG. 6 is a flowchart for describing an example of a method of performing runtime verification by the processor of the server according to exemplary embodiments of the present disclosure.

FIG. 6 is a flowchart for describing an example of a method of performing runtime verification by the processor of the server according to exemplary embodiments of the present disclosure.

Referring to FIG. 6, when the processor 110 of the server 100 receives a runtime verification performing command through the communication unit 130, the processor 110 of the server 100 may recognize the execution order of every block included in the first program (S220).

Particularly, the meta information 400 may include information on the execution order of each of all blocks included in the first program. In this case, the processor 110 may recognize the execution order of each of all blocks included in the first program based on the information on the execution order. However, the present disclosure is not limited thereto, and the meta information 400 may not include the information on the execution order. In this case, the processor 110 may recognize the execution order by designating a breakpoint to each statement of all blocks included in the first program. Hereinafter, the method of recognizing, by the processor 110, the execution order when the meta information 400 does not include the information on the execution order will be described below with reference to FIG. 7.

In the meantime, the processor 110 of the server 100 may perform the runtime verification on the first program and the second program by using the meta information 400 according to the execution order (S230).

For example, the processor 110 may execute all of the blocks included in the first program and all of the blocks included in the second program according to the execution order. Further, the processor 110 may perform the runtime verification on the first program and the second program. However, the present disclosure is not limited thereto.

In the meantime, according to the exemplary embodiments of the present disclosure, the meta information 400 may not include the information on the execution order. In this case, the processor 110 of the server 100 may recognize the execution order based on a result of the execution of the first program and a result of the execution of the second program. Hereinafter, the method of recognizing, by the processor 110, the execution order will be described with reference to FIG. 7.

Figure 7:
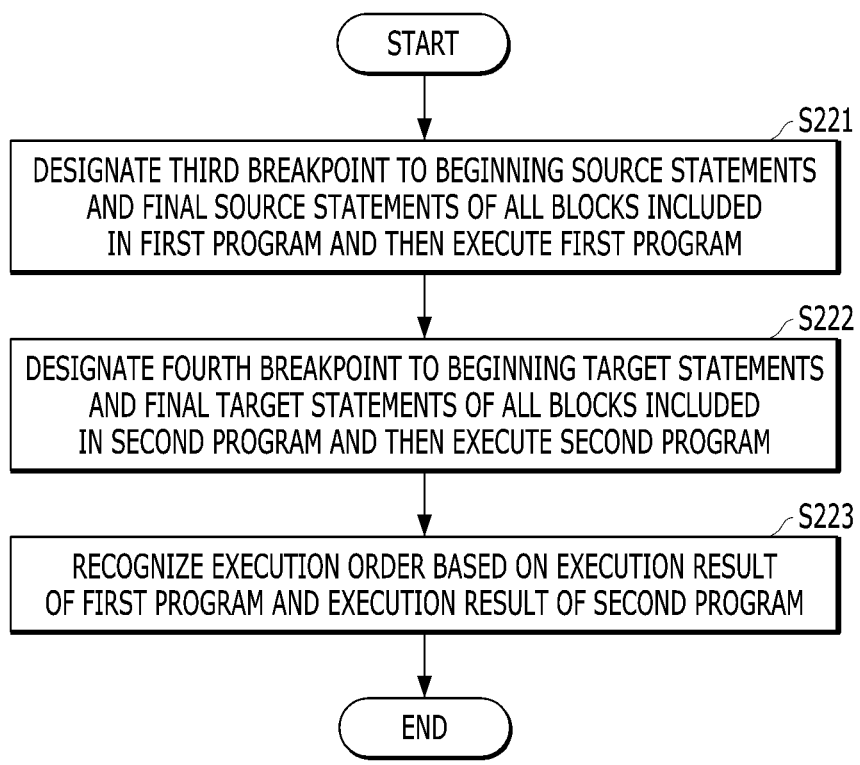
FIG. 7 is a flowchart for describing an example of a method of recognizing an execution order by the processor of the server according to exemplary embodiments of the present disclosure.

FIG. 7 is a flowchart for describing an example of the method of recognizing the execution order by the processor of the server according to exemplary embodiments of the present disclosure.

Referring to FIG. 7, the processor 110 of the server 100 may execute the first program after designating a third breakpoint to the beginning source statements and the final source statements of all of the blocks included in the first program (S221).

Accordingly, when the processor 110 executes the first program, the execution of the first program may be stopped in the beginning source statement of any one block among all of the blocks or the final source statement of any one block among all of the blocks.

In the meantime, the processor 110 of the server 100 may execute the second program after designating a fourth breakpoint to the beginning target statements and the final target statements of all of the blocks included in the second program (S222).

Accordingly, when the processor 110 executes the second program, the execution of the second program may be stopped in the beginning target statement of any one block among all of the blocks or the final target statement of any one block among all of the blocks.

In the meantime, according to exemplary embodiments of the present disclosure, the processor 110 of the server 100 may designate the third breakpoint through a debugger existing in the first program and designate the fourth breakpoint through a debugger existing in the second program. In this case, a specification of the debugger existing in the first program may be different from a specification of the debugger existing in the second program. For example, a command for setting the third breakpoint in the debugger of the first program may be "set breakpoint". Further, a command for setting the fourth breakpoint in the debugger of the second program may be "enable breakpoint". Accordingly, the processor 110 of the server 100 may define a specification of the debugger for universally using the runtime verification according to the present disclosure and store the defined specification in the storage unit 120. In this case, the specification of the debugger stored in the storage unit 120 of the server 100 may include start, set breakpoint, unset breakpoint, continue, step over, and print. However, the present disclosure is not limited thereto.

Herein, start may perform an operation of executing the program.

Particularly, the processor 110 of the server 100 may perform an operation of executing the first program and the second program through start.

set breakpoint may perform an operation of setting a breakpoint in the program.

Particularly, the processor 110 of the server 100 may set the third breakpoint in the first program and set the fourth breakpoint in the second program through set breakpoint.

unset breakpoint may perform an operation of releasing the breakpoint in the program.

Particularly, the processor 110 of the server 100 may release the third breakpoint set in the first program and release the fourth breakpoint set in the second program through unset breakpoint.

continue may move an execution flow of the program to a next breakpoint.

Particularly, the processor 110 of the server 100 may move an execution flow of the first program to the third breakpoint and move an execution flow of the second program to the fourth breakpoint through continue. However, the present disclosure is not limited thereto.

step over may execute a next statement.

Particularly, the processor 110 of the server 100 may execute at least one statement included in the first program and execute at least one statement included in the second program through step over.

print may output a value of a designated variable.

Particularly, the processor 110 of the server 100 may output a value of at least one source variable included in the first program and output a value of at least one target variable included in the second program through print. However, the present disclosure is not limited thereto.

In the meantime, the processor 110 of the server 100 may recognize an execution order based on a result of the execution of the first program and a result of the execution of the second program (S223). That is, the processor 110 of the server 100 may recognize the execution order while executing all of the blocks included in the first program, in which the third breakpoint is designated, and the second program, in which the fourth breakpoint is designated.

In the meantime, according to the exemplary embodiments of the present disclosure, the processor 110 may recognize a source line number of the location, at which the first program is stopped, after operation S222. Further, the processor 110 may recognize a target line number of the location, at which the second program is stopped. Further, the processor 110 may recognize whether the block, in which the first program is stopped, is the same as or corresponds to the block, in which the second program is stopped, based on the source line number and the target line number. In the meantime, when the block, in which the first program is stopped, is the same as or corresponds to the block, in which the second program is stopped, the processor 110 may designate a first sub breakpoint to all of the lines associated with at least one source variable included in the block, in which the first program is stopped. Further, the processor 110 may designate a second sub breakpoint to all of the lines associated with at least one target variable included in the block in which the second program is stopped. Further, the processor 110 may perform the runtime verification on all of the variables included in each of the first program and the second program by executing the first program and the second program. Accordingly, even though the information on the execution order is not included in the meta information 400, the processor 110 may perform the runtime verification on all of the variables included in the first program and the second program in order. However, the present disclosure is not limited thereto.

In the meantime, according to the present disclosure, the runtime verification may be performed based on the variable data. Hereinafter, the method of performing, by the processor 110 of the server 100, the runtime verification based on the variable data will be described with reference to FIG. 8.

Figure 8:
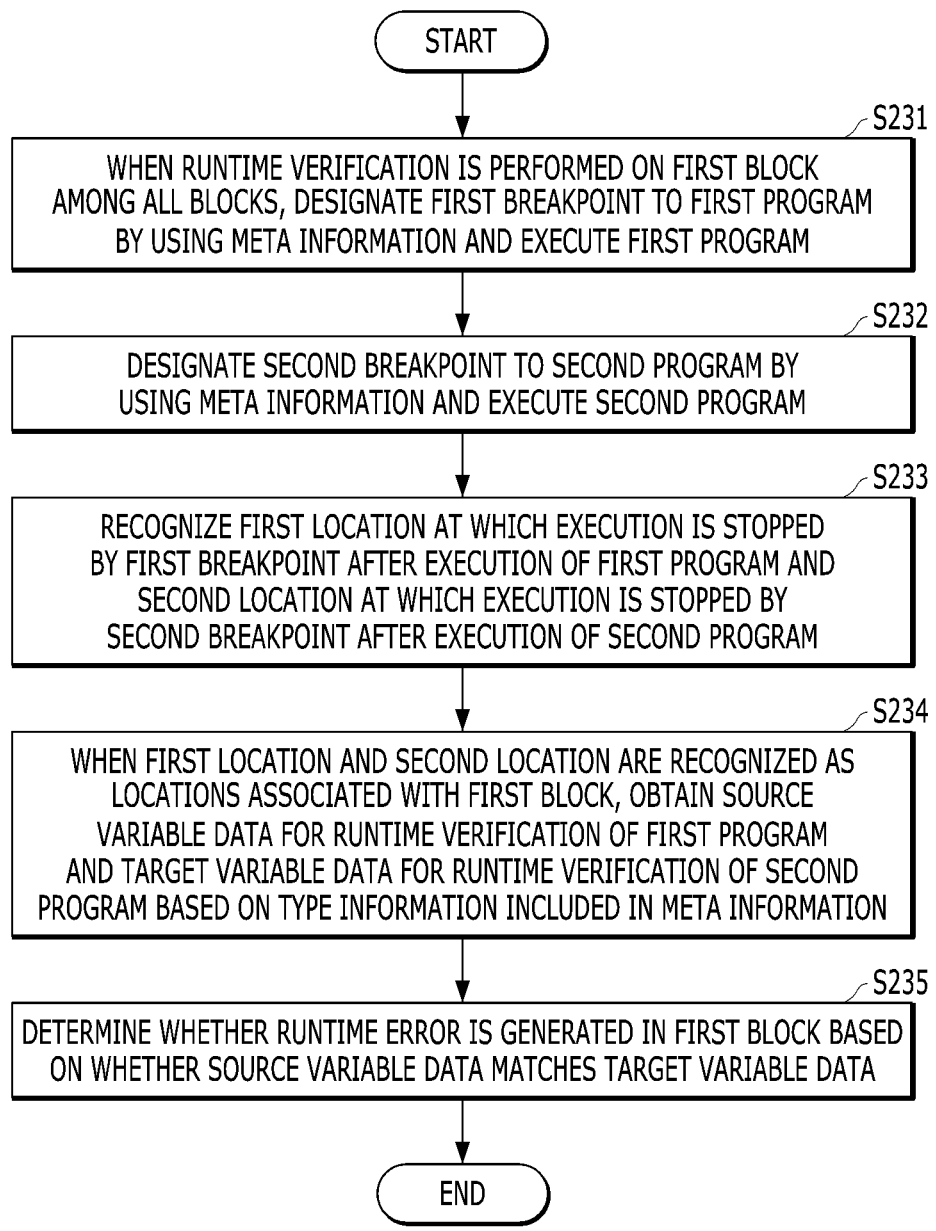
FIG. 8 is a flowchart for describing an example of a method of determining whether a runtime error is generated by the processor of the server according to exemplary embodiments of the present disclosure.

FIG. 8 is a flowchart for describing an example of a method of determining whether a runtime error is generated by the processor of the server according to exemplary embodiments of the present disclosure.

Referring to FIG. 8, when the processor 110 of the server 100 performs the runtime verification on the first block among all of the blocks, the processor 110 of the server 100 may execute the first program after designating a first breakpoint in the first program by using the meta information 400. Herein, the first block may mean any one block among all blocks.

Particularly, the processor 110 may recognize first location information 431 included in the meta information 400. Herein, the first location information 431 may include the file name of the first program and information on the line in which the breakpoint is located in the first program. Further, the processor 110 may designate the first breakpoint to the source line associated with the first location information 431 in the first block of the first program based on the first location information 431. However, the present disclosure is not limited thereto.

In the meantime, the processor 110 of the server 100 may execute the second program after designating the second breakpoint to the second program by using the meta information 400 (S232).

Particularly, the processor 110 may designate the second break point to the target line associated with the second location information 432 of the second program based on the second location information 432. Herein, the second location information 432 may include the file name of the second program and location information on the line in which the break point is located in the second program. However, the present disclosure is not limited thereto.

In the meantime, the processor 110 of the server 100 may recognize a first location, at which the execution is stopped by the first break point after the execution of the first program, and a second location, at which the execution is stopped by the second break point after the execution of the second program.

Then, when the processor 110 of the server 100 recognizes the first location and the second location as the locations associated with the first block, the processor 110 of the server 100 may obtain source variable data for the runtime verification of the first program and target variable data for the runtime verification of the second program based on the type information 433 included in the meta information 400 (S234).

Herein, the source variable data may be the data recorded in the variable by a specific source line included in the first program. Further, the target variable data may be the data recorded in the variable by a specific target line included in the second program.

Particularly, the processor 110 may check the type information 433 on the location at which the execution of the first program and the second program is stopped. Then, the processor 110 may execute the first program and the second program based on the checked type information 433.

For example, when the type information 433 included in the meta information 400 is first type information indicating that one target line is converted from one source line, the processor 110 may obtain source variable data by executing the first program to the first location at which the first breakpoint is located. Then, the processor 110 may obtain target variable data by executing the second program to the second location at which the second breakpoint is located.

For another example, when the type information 433 included in the meta information 400 is second type information indicating that the plurality of target lines is converted from one source line, the processor 110 may obtain source variable data by executing the first program to the first location at which the first breakpoint is located. Further, the processor 110 may obtain target variable data by executing all of the plurality of target lines included in the second program.

For another example, when the type information 433 is third type information indicating that one target line is converted from the plurality of source lines, the processor 110 may obtain source variable data by executing all of the plurality of source lines included in the first program. Further, the processor 110 may obtain target variable data by executing the second program to the second location. However, the present disclosure is not limited thereto.

In the meantime, the processor 110 of the server 100 may determine whether a runtime error is generated for the first block based on whether the source variable data matches the target variable data (S235).

For example, when the source target data matches the target variable data, the processor 110 may determine that the runtime error does not exist. Hereinafter, the method of determining, by the processor 110, whether the runtime error exists will be described with reference to FIG. 9.

Figure 9:
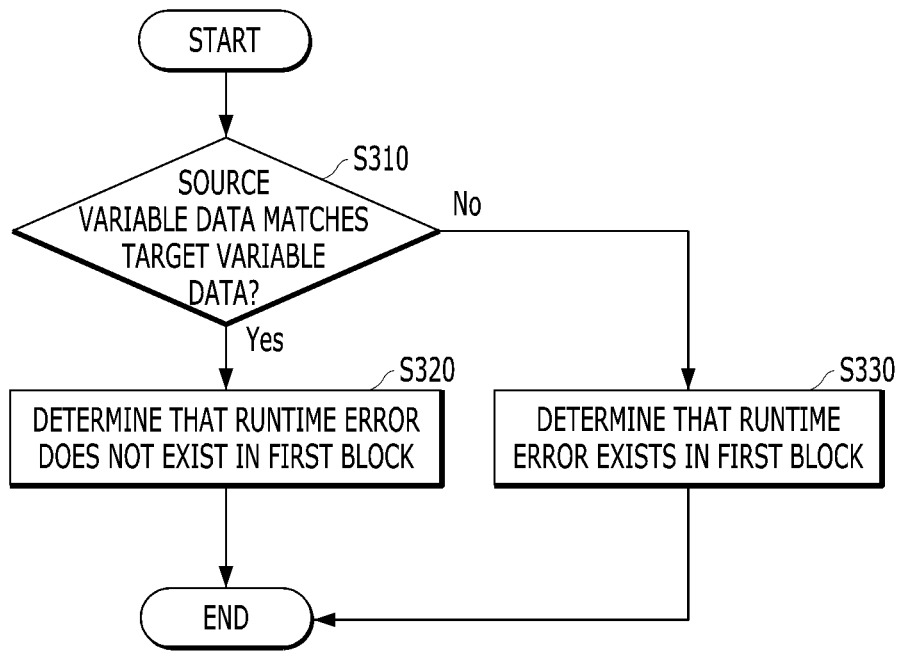
FIG. 9 is a flowchart for describing an example of a method of determining whether a runtime error exists by the processor of the server according to exemplary embodiments of the present disclosure.

FIG. 9 is a flowchart for describing an example of the method of determining whether a runtime error exists by the processor of the server according to exemplary embodiments of the present disclosure.

Referring to FIG. 9, when the processor 110 of the server 100 recognizes that the source variable data matches the target variable data (S310, YES), the processor 110 of the server 100 may determine that the runtime error does not exist in the first block (S320).

In this case, the processor 110 may perform the runtime verification on the blocks after the first block. However, the present disclosure is not limited thereto.

In the meantime, when the processor 110 of the server 100 does not recognize that the source variable data matches the target variable data (S310, NO), the processor 110 of the server 100 may determine that the runtime error exists in the first block (S330).

In this case, the processor 110 may record a log and the like for the runtime error of the first block in the storage unit 120, and perform the runtime verification on the blocks after the first block. However, the present disclosure is not limited thereto.

In the meantime, when the processor 110 of the server 100 recognizes that the runtime error exists in a specific block after completing the runtime verification for all of the blocks, the processor 110 of the server 100 may control the communication unit 130 so as to transmit information indicating that the runtime error exists in the corresponding specific block to a user terminal transmitting the runtime verification performing command. However, the present disclosure is not limited thereto.

According to the exemplary embodiments of the present disclosure, the processor 110 of the server 100 may use the meta information 400 when performing the runtime verification on the first program written in the source language and the second program written in the target language. In this case, a speed of the operation of performing, by the processor 110, the runtime verification may be improved.

According to other exemplary embodiments of the present disclosure, the processor 110 of the server 100 performs the runtime verification by using the meta information 400, thereby accurately checking whether the first program written in the source language is correctly converted to the second program written in the target language.

Figure 10:
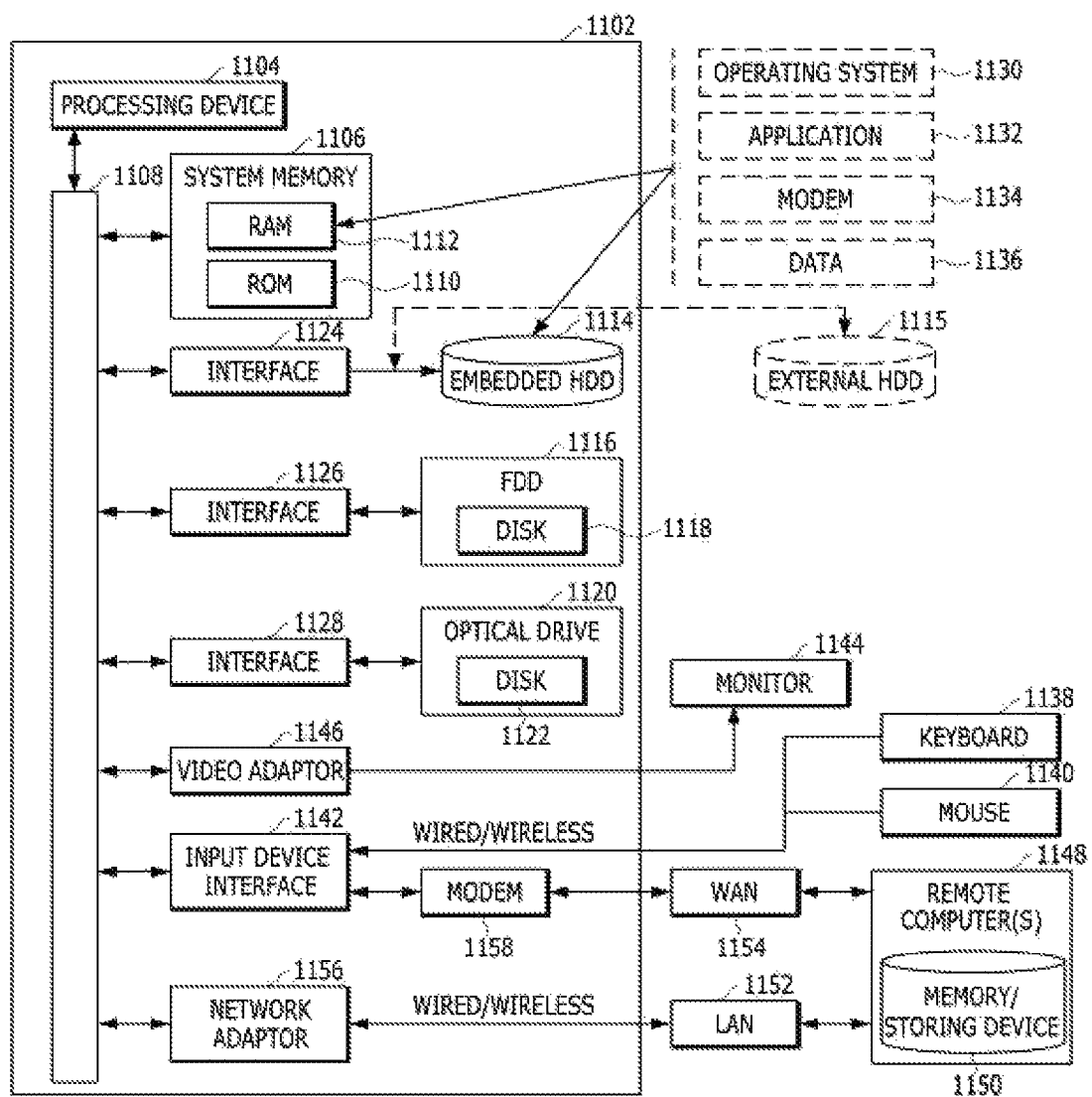
FIG. 10 is a general schematic diagram illustrating an example of a computing environment in which the exemplary embodiments of the present disclosure are implementable.

FIG. 10 is a general schematic diagram illustrating an example of a computing environment in which the exemplary embodiments of the present disclosure are implementable.

The present disclosure has been generally described in relation to a computer executable command executable in one or more computers, but those skilled in the art will appreciate that the present disclosure is combined with other program modules and/or be implemented by a combination of hardware and software.

In general, a module in the present specification includes a routine, a procedure, a program, a component, a data structure, and the like performing specific task or implementing a specific abstract data form. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. The computer readable medium is a computer accessible medium, and includes volatile and non-volatile media, transitory and non-transitory media, and portable and non-portable media. As a non-limited example, the computer readable medium may include a computer readable storage medium and a computer readable transport medium.

The computer readable storage medium includes volatile and non-volatile media, transitory and non-transitory media, portable and non-portable media constructed by a predetermined method or technology, which stores information, such as a computer readable command, a data structure, a program module, or other data. The computer readable storage medium includes a random access memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routine helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of computer readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated well that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display device are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a server computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158 that is connected to a communication server on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program or a medium accessible from a predetermined computer-readable device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. A term "machine-readable medium" includes a wireless channel and various other media, which are capable of storing, holding, and/or transporting a command(s) and/or data, but is not limited thereto.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

What is claimed is:

1. A non-transitory computer readable medium containing a computer program,
   wherein the computer program includes commands which cause a computer to execute steps, the steps comprising:
   receiving a command for converting a first computer program written in a first source language to a second computer program written in a second source language;
   in response to the command for converting, converting the first computer program to the second computer program, wherein the converting further comprises the steps of:
   automatically, generating block information for the first computer program by analyzing the first computer program;
   automatically, inserting an annotation into the second computer program, the annotation including information on at least one source line of source code of the first computer program, and associated with at least one target line of the source code of the second computer program, wherein the information comprises location information of the at least one source line in the first computer program and information on a block including the at least one source line in the first computer program; and
   automatically, generating meta information used for runtime verification on the first computer program and the second computer program based on the block information and the annotation, the meta information comprising information on a location of a breakpoint associated with each of the first and second computer programs; and
   when receiving a runtime verification performing command:
   performing runtime verification of the first computer program and the second computer program using the meta data information to determine if a runtime error has occurred.

2. The non-transitory computer readable medium of claim 1, wherein the block information comprises respective identification information on at least one block included in the first computer program and respective information on at least one variable included respectively in the at least one block.

3. The non-transitory computer readable medium of claim 2, wherein when the at least one blocks includes a first block, the meta information comprises block identification information associated with the first block, information on at least one source variable included in the first block, and statement information for at least one statement associated respectively with the at least one source variables.

4. The non-transitory computer readable medium of claim 3, wherein the statement information comprises first location information on a location of a breakpoint associated respectively with the at least one source variables in the first computer program, second location information on a location of a breakpoint associated respectively with the at least one source variables in the second computer program, and type information associated with a method of converting at least one first statement in the first computer program into the target language.

5. The non-transitory computer readable medium of claim 4, wherein the type information comprises first type information indicating that one source line included in the first computer program has been converted to one target line included in the second computer program, second type information indicating that one source line included in the first computer program has been converted to a plurality of target lines included in the second computer program, and third type information indicating that a plurality of source lines included in the first computer program has been converted to one target line included in the second computer program.

6. The non-transitory computer readable medium of claim 5, wherein the steps further comprise:
when receiving a runtime verification performing command, recognizing the execution order of each of all blocks included in the first computer program; and
performing runtime verification of the first computer program and the second computer program using the meta information according to the execution order.

7. The non-transitory computer readable medium of claim 6, wherein the performing runtime verification of the first computer program and the second computer program using the meta information according to the execution order comprises:
when performing runtime verification of the first block among all blocks, executing the first computer program after designating a first breakpoint to the first computer program using the meta information;
executing the second computer program after designating a second breakpoint to the second computer program using the meta information;
recognizing a first location where an execution is stopped by the first breakpoint after executing the first computer program and a second location where an execution is stopped by the second breakpoint after executing the second computer program;
when recognizing that the first location and the second location are associated with the first block, obtaining source variable data for runtime verification of the first computer program and target variable data for runtime verification of the second computer program based on the type information included in the meta information; and
determining whether a runtime error occurs for the first block based on whether the source variable data and the target variable data are identical.

8. The non-transitory computer readable medium of claim 7, wherein the determining whether a runtime error occurs for the first block based on whether the source variable data and the target variable data are identical comprises:
when recognizing that the source variable data and the target variable data are non-identical, determining that a runtime error exists in the first block; or
when recognizing that the source variable data and the target variable data are identical, determining that a runtime error does not exist in the first block.

9. The non-transitory computer readable medium of claim 7, wherein the obtaining source variable data for runtime verification of the first computer program and target variable data for runtime verification of the second computer program based on the type information included in the meta information comprises:
if the type information is the first type information, obtaining the source variable data by executing the first computer program until the first location, and obtaining the target variable data by executing the second computer program to the second location.

10. The non-transitory computer readable medium of claim 7, wherein the obtaining source variable data for runtime verification of the first computer program and target variable data for runtime verification of the second computer program based on the type information included in the meta information comprises:
if the type information is the second type information, obtaining the source variable data by executing the first computer program until the first location, and obtaining the target variable data by executing all of the plurality of target lines included in the second computer program.

11. The non-transitory computer readable medium of claim 7, wherein the obtaining source variable data for runtime verification of the first computer program and target variable data for runtime verification of the second computer program based on the type information included in the meta information comprises:
if the type information is the third type information, obtaining the source variable data by executing all of the plurality of source lines included in the first computer program, and obtaining the target variable data by executing the second computer program until the second location.

12. The non-transitory computer readable medium of claim 6, wherein the when receiving a runtime verification performing command, recognizing the execution order of each of all blocks included in the first computer program comprises:
if the meta information includes execution order information for each of all blocks included in the first computer program, recognizing the execution order of each of the all blocks based on the execution order information.

13. The non-transitory computer readable medium of claim 6, wherein the when receiving a runtime verification performing command, recognizing the execution order of each of all blocks included in the first computer program comprises:
executing the first computer program after designating a third breakpoint in beginning source statement and final source statement of all blocks included in the first computer program, executing the second computer program after designating a fourth breakpoint in beginning target statement and final target statement of all blocks included in the second computer program; and recognizing the execution order based on execution result of the first computer program and execution result of the second computer program.

\* \* \* \* \*